H. B. DAVIDSON.
REFLECTING DEVICE FOR AUTOMOBILES.
APPLICATION FILED NOV. 26, 1919.
1,372,606.
Patented Mar. 22, 1921.
2 SHEETS—SHEET 1.
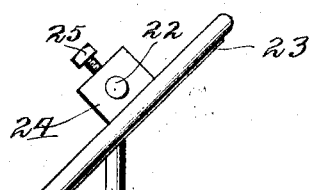
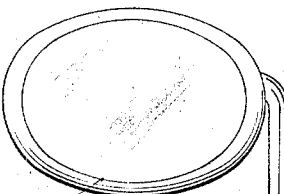
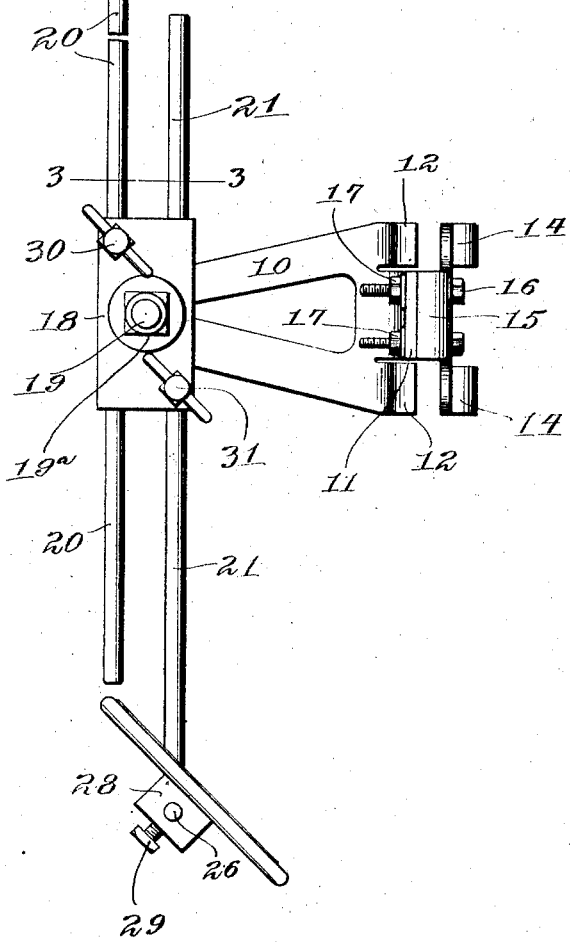
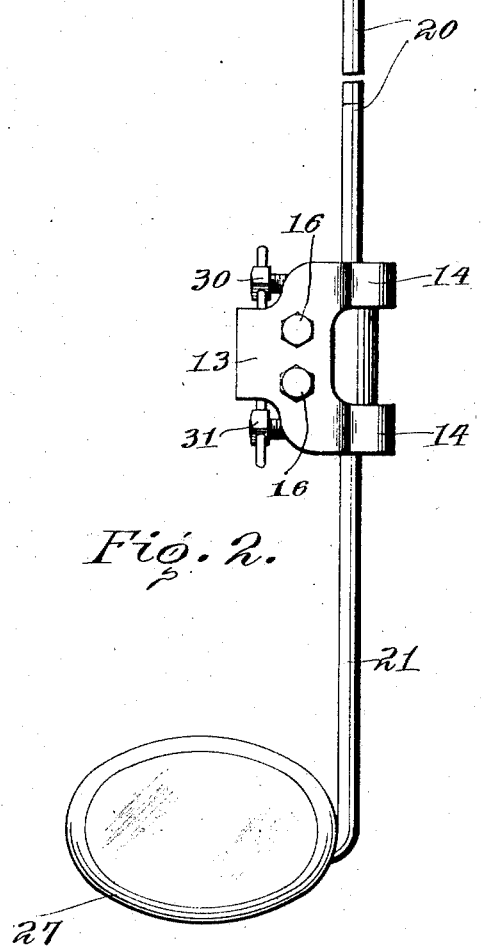
WITNESSES
INVENTOR
H. B. Davidson.
BY
ATTORNEYS H. B. DAVIDSON.
REFLECTING DEVICE FOR AUTOMOBILES.
APPLICATION FILED NOV. 26, 1919.

1,372,606.

Patented Mar. 22, 1921.
2 SHEETS—SHEET 2.

WITNESSES
Geo. S. Brock

INVENTOR
H. B. Davidson.
BY
Munn & Co.
ATTORNEYS

UNITED STATES PATENT OFFICE.

HOYT B. DAVIDSON, OF TACOMA, WASHINGTON.

REFLECTING DEVICE FOR AUTOMOBILES.

1,372,606.   Specification of Letters Patent.   Patented Mar. 22, 1921.

Application filed November 26, 1919.   Serial No. 340,836.

*To all whom it may concern:*

Be it known that I, HOYT B. DAVIDSON, a citizen of the United States, and a resident of Tacoma, in the county of Pierce and State of Washington, have invented certain new and useful Improvements in Reflecting Devices for Automobiles, of which the following is a specification.

My invention relates to reflectors and has reference more particularly to reflecting devices applied to automobiles.

An object of my device is to provide means whereby the driver of an automobile may obtain a perfect view of road to the rear of the car from the driving seat.

Another object is to produce a device whereby the driver may obtain a rear view of the road without taking the eyes from the front of the car.

Another object is to produce a reflecting device whereby the driver from the driver's seat can obtain a rear view or a view at any lateral angle without diverting attention from the front of the car.

With these and other objects in view my invention consists broadly in applying a pair of vertically spaced apart mirrors adjacent to the side bar of the windshield of an automobile in such angular relation to each other that a perfect image of the road to the rear of the car is reflected to the driver while directing his vision forwardly.

My invention consists further in the use of a pair of reflectors located adjustably one above the other and adjustably connected together, and means for detachably and adjustably connecting the assembly to the windshield or other suitable part of an automobile.

My invention consists further in certain particular features of construction arrangement and combination of parts as will be hereinafter fully described and particularly pointed out in the claims, reference being had to the accompanying drawing forming a part hereof, in which—

Figure 1 is a side elevation of the device before application to an automobile,

Fig. 2 is a rear elevation of the device.

Figure 3:
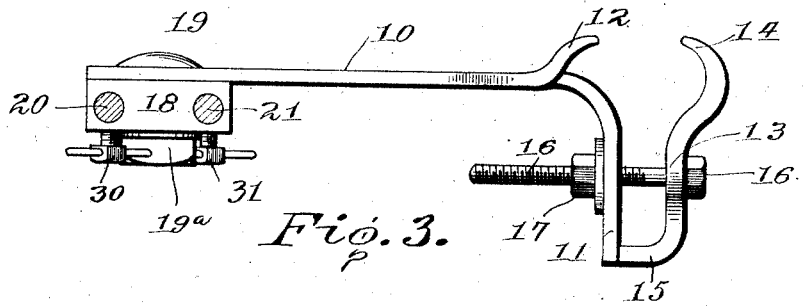
Fig. 3 is a view taken on line 3—3 of Fig. 1 showing the clamp in top plan and the mirror carrying rods in section.

The inventive idea involved is susceptible of expression in a variety of forms but I have found that a practical development may be embodied in the device exemplified in the drawings.

Figure 4:
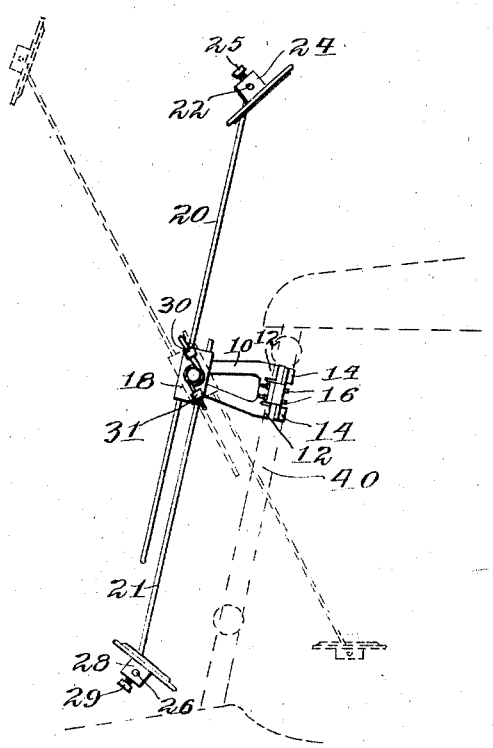
Fig. 4, is a side elevation showing one method applying the invention to the windshield of an automobile, the auto top and adjustment of the assembly being indicated by dotted lines.
Figure 5:
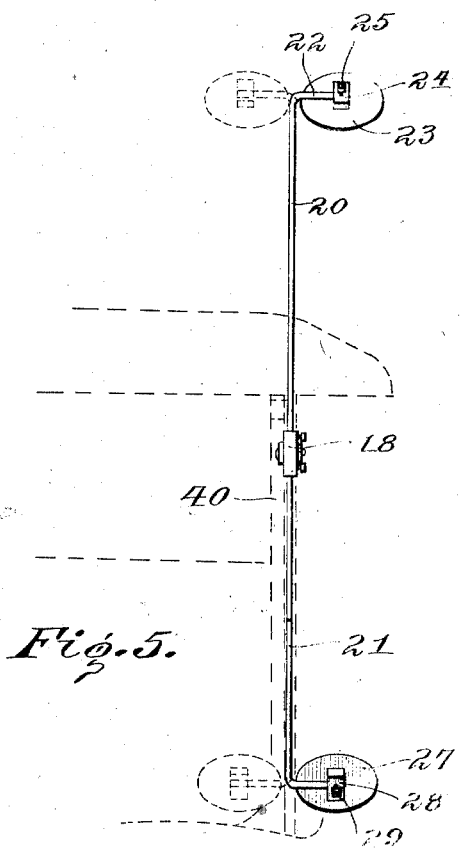
Fig. 5 is a front elevation of the same, the front of auto top and one adjustment of the assembly being indicated by dotted lines.

In carrying out my invention an essential is a bracket arm 10 having at one end a clamping device consisting of the rigid jaw 11 and upper and lower claws 12 and a movable clamping jaw 13, having upper and lower claws 14 at one end, and between which and the spaced apart opposing claws 12, the side rail of the windshield, as indicated in dotted lines Figs. 4 and 5, is inserted, and held. The opposite end of the movable clamp member 13 is bent as at 15 and bears against the stationary jaw 11 against which it is held by the screw bolts 16 passing through the rigid jaw and movable jaw, and held by the jam nuts 17.

At the outer end of the bracket arm 10 a mirror support and guide block 18 is pivotally secured by a bolt 19 which passes through arm 10 and block 18 and on which nut 19ᵃ is screwed. This support and guide block is provided with parallel passages extending entirely through the same on opposite sides of the pivot. Slidably mounted in these passages are rods 20 and 21 which pass entirely through the block, rod 20 extending upwardly and having its upper end bent at an angle 22 upon which is rotatably mounted the mirror 23 by means of bearings 24, the bent end being clamped to the bearing by the set screw 25. The other rod 21 extends downwardly and has its end bent at angle 26 upon which the lower reflector 27 is rotatably mounted by means of bearing 28; the bent end being clamped to the bearing by the set screw 29.

The bearings for the upper and lower reflectors are made in the form of a lug projecting from the rear face of the reflectors, said lugs having threaded thereinto the set screws before mentioned.

The bracket is preferably secured to the side bar or rail of the windshield frame, though it is obvious that it may be clamped to any suitable part of the body or top of the car which is adjacent the driver's seat.

I have found that the most advantageous location for the device is at the left hand side of the car with the bracket clamped to the side rail of the windshield frame indicated in dotted lines and bearing the reference numeral character 40, as clearly shown in Fig. 5.

The reflector support and guide block as hereinbefore stated is provided with parallel passages passing entirely through it in a vertical direction, and in these passages are adapted to slide the mirror standards or rods 20 and 21. The rods can be slid to cover as wide a range as may be necessary according to the height of the top of the car when a covered or closed car is used and these rods 20 and 21 may be rigidly held at any point by the set screws 30 and 31 respectively.

The rods 20 and 21 are also rotatably mounted in the support block, whereby the reflectors at the upper and lower ends respectively can be swung to project over the top of the car and in front of the windshield, as indicated in dotted lines in Fig. 5, and to the side of same as indicated in full lines in same figure, and in Fig. 4.

The bracket arm 10 may be so applied to the windshield frame that it projects laterally, or it may be so secured to the windshield that it projects forwardly or to the front of the same, as more clearly shown in Fig. 4.

With the bracket applied in either of the above positions, the rods 20 and 21 are adjusted so that the upper reflector is above the top of the car, the reflector having been adjusted and clamped at the proper reflecting angle on the bent arm 22, and the lower reflector, at the lower part of the windshield at one side, the reflector having also been adjusted and clamped at its proper reflecting angle; these adjustments of the reflectors and their supporting rods are to be made in conformity with a well known law of light transmission that the angle of reflection equals the angle of incidence. From the above it will be understood that a perfect image of the road to the rear for a considerable distance will be thrown on to the lower reflector either immediately in front of the driver or to his side, as the guide block may be swung to the position indicated by the oblique dotted lines in Fig. 4.

The device may be applied to either side of an automobile as all the parts are reversible.

I claim:—

1. A reflecting device for motor cars comprising a pair of vertically spaced apart coöperating reflectors angularly adjustable relatively to each other in a plurality of planes, standards carrying said reflectors, a single guide block, said standards rotatably and slidably mounted in said block, a bracket pivotally secured to said guide block, means for adjusting said reflectors about a horizontal axis with respect to the standards, means for adjusting said standards about a vertical axis and double-jointed clamp means for securing said bracket to the windshield of the motor car, said bracket including one jaw of said clamp means.

2. In a reflecting device for motor cars, the combination with the wind shield thereof, of a bracket adapted to be clamped to the side bar of said wind shield, a guide block pivotally mounted on said bracket, said guide block having parallel passages therethrough, a pair of reflector supporting rods slidably and rotatably mounted in said passages, a reflector mounted to turn about a horizontal axis at the upper end of one of said rods, and a coöperating reflector mounted to turn about a horizontal axis at the lower end of the other of said rods.

3. In a reflecting device for motor cars, a guide block for supporting the reflecting medium, a bracket for pivotally supporting said guide block and consisting of a plate having a hinge connection at one end with the aforesaid guide block, an arm bent from the opposite end out of the plane of the plate and in one direction, integral curved claws disposed above and below said bent arm at that end of the plate and on the opposite side of the plane of the plate, a movable jaw member having one end bent and abutting the aforesaid plate which constitutes a rigid jaw member, said movable jaw also having spaced apart curved claws, said claws opposing the curved claws of the rigid jaw plate, and adjustable means connecting the rigid and movable jaws, whereby they may be rigidly secured to the side-rail of a vehicle windshield.

HOYT B. DAVIDSON.